United States Patent
Joseph

(10) Patent No.: US 10,660,338 B2
(45) Date of Patent: May 26, 2020

(54) SPOROCIDAL DISINFECTANT OR SANITISING COMPOSITION

(71) Applicant: Peracide (UK) Limited, Sheffield (GB)

(72) Inventor: Michael Joseph, Sheffield (GB)

(73) Assignee: PERACIDE (UK) LIMITED, Sheffield (GB)

( * ) Notice: Subject to any disclaimer, the term of this patent is extended or adjusted under 35 U.S.C. 154(b) by 0 days.

(21) Appl. No.: 15/111,219

(22) PCT Filed: Jan. 14, 2015

(86) PCT No.: PCT/GB2015/050068
§ 371 (c)(1),
(2) Date: Jul. 13, 2016

(87) PCT Pub. No.: WO2015/107342
PCT Pub. Date: Jul. 23, 2015

(65) Prior Publication Data
US 2016/0330971 A1    Nov. 17, 2016

(30) Foreign Application Priority Data
Jan. 14, 2014 (GB) .................................. 1400596.1

(51) Int. Cl.
A01N 59/00 (2006.01)
A01N 25/08 (2006.01)
A01N 37/46 (2006.01)

(52) U.S. Cl.
CPC ............ *A01N 59/00* (2013.01); *A01N 25/08* (2013.01); *A01N 37/46* (2013.01)

(58) Field of Classification Search
CPC .................................................... A01N 59/00
See application file for complete search history.

(56) References Cited

U.S. PATENT DOCUMENTS

| | | | |
|---|---|---|---|
| 4,262,816 A | 4/1981 | Margulies | |
| 5,273,184 A | 1/1993 | Rizzuto | |
| 5,407,685 A | 4/1995 | Malchesky et al. | |
| 6,158,614 A | 12/2000 | Haines et al. | |
| 6,210,639 B1 | 4/2001 | Gayle et al. | |
| 6,629,667 B2 | 10/2003 | Tramontina et al. | |
| 7,291,276 B1 | 11/2007 | Neal | |
| 7,534,756 B2 | 5/2009 | Tichy et al. | |
| 7,806,291 B2 | 10/2010 | Anderson | |
| 2003/0129254 A1 | 7/2003 | Yasuhara et al. | |
| 2006/0124476 A1 | 6/2006 | Sivakumar et al. | |
| 2007/0241022 A1* | 10/2007 | Denome | B65B 9/042 206/524.7 |
| 2008/0000931 A1 | 1/2008 | Tichy et al. | |
| 2008/0160057 A1 | 7/2008 | Neville | |
| 2010/0075883 A1 | 3/2010 | Geret et al. | |
| 2010/0124784 A1* | 5/2010 | Read | A61L 2/28 436/1 |
| 2011/0177148 A1* | 7/2011 | Dicosimo | A01N 63/02 424/411 |
| 2013/0259957 A1* | 10/2013 | Dagher | A01N 37/16 424/722 |
| 2016/0330971 A1 | 11/2016 | Joseph | |
| 2017/0304478 A1 | 10/2017 | Joseph | |

FOREIGN PATENT DOCUMENTS

| | | | |
|---|---|---|---|
| EP | 1364610 | | 11/2003 |
| EP | 1755387 | | 11/2012 |
| EP | 2692844 | | 2/2014 |
| FR | 2883478 | | 9/2006 |
| GB | 2506412 | | 9/2012 |
| TW | 200815056 | | 4/2008 |
| WO | WO 2005/112631 | | 12/2005 |
| WO | WO 2008/060778 | * | 5/2008 |
| WO | WO 2008/079170 | | 7/2008 |
| WO | WO 2011/161396 | | 12/2011 |
| WO | PCT/GB2015/050068 | | 7/2015 |
| WO | WO2015107342 | | 7/2015 |
| WO | WO2016055773 | | 4/2016 |

OTHER PUBLICATIONS

Namboodri et al. Decolorizing Dyes With Chlorine and Ozone: Part II. 1994.*

* cited by examiner

*Primary Examiner* — Adam C Milligan
*Assistant Examiner* — Sarah Alawadi
(74) *Attorney, Agent, or Firm* — Brian S. Boyer; Syndicated Law, PC

(57) ABSTRACT

Solid disinfectant dosage forms having a peroxy activator and a peroxy compound are provided. The dosage form can be selected so that addition of the dosage form to a predetermined quantity of water produces a disinfectant solution containing peracetic acid in a concentration of at least about 1000 ppm. The dosage form can include a colour indicator arranged to provide a first colour signal when the concentration of peracetic acid is lower than about 1000 ppm and a second colour signal when the concentration is higher than about 1000 ppm and a third colour signal when the concentration falls below about 1000 ppm. The peroxy compound can be selected from the group consisting of sodium percarbonate, ammonium persulphate, calcium percarbonate, magnesium percarbonate, sodium perborate, sodium persulfate, sodium perphosphate and mixtures thereof.

15 Claims, No Drawings

SPOROCIDAL DISINFECTANT OR SANITISING COMPOSITION

CROSS-REFERENCE TO RELATED APPLICATIONS

This application is a National Stage of International Application No. PCT/GB2015/050068, filed Jan. 14, 2015, which claims the benefit of GB 1400596.1, filed Jan. 14, 2014, each of which is incorporated herein by reference in its entirety.

BACKGROUND

This invention relates to a disinfectant or sanitising composition, particularly but not exclusively sporocidal compositions for use in sanitising or disinfection of surfaces and clinical devices in hospitals or other locations in which control of infectious micro-organisms is imperative. Preferred embodiments of the invention have sporocidal and virucidal activity. The invention also provides a method of use of the sanitising/disinfectant composition. Safety considerations in handling such materials are important.

Chlorine dioxide, hypochlorite and quaternary ammonium compound based disinfectants are routinely used in hospitals, but these are not high level disinfectants and are not sporocidal at useable concentrations. They perform poorly in dirty conditions. Peracetic acid is a high level disinfectant and is sporocidal at a concentration of 4000 ppm. However, it is commonly produced in a liquid form and this is extremely volatile, corrosive and flammable.

SUMMARY

According to the present invention a solid disinfectant dosage form comprises:
 a peroxy activator;
 a peroxy compound;
 selected so that addition of the dosage form to water produces a disinfectant solution containing peracetic acid in a concentration of at least about 1000 ppm; and
 a colour indicator arranged to provide a first colour signal when the concentration of peracetic acid is lower than about 1000 ppm and a second colour signal when the concentration is higher than about 1000 ppm and an optional third colour signal when the concentration falls below about 1000 ppm.

According to a preferred embodiment the threshold concentration of peracetic acid is lower than about 4000 ppm for the first, second and optional third colour signals.

In a particularly advantageous embodiment a solid disinfectant dosage form comprises:
 a peroxy activator;
 a peroxy compound;
 a colour indicator system; and
 a buffer;
 wherein the addition of the dosage form to water produces a disinfectant solution containing peracetic acid in a concentration of at least 4000 ppm;
 and wherein the colour indicator comprises a first non-mordant dye having a first colour and being bleachable after a first dye lifetime of 0.5 to 10 minutes in a test solution at 20° C. to 40° C. and pH8.0 to 8.5 containing 0.05 wt % to 0.15 wt % of the dye and 45 wt % to 55 wt % of sodium percarbonate;
 a second non-mordant dye having a second colour different from the first colour and bleachable after a second dye lifetime of not less than 24 hours in the test solution; and
 an optional third non-mordant dye having a third colour different from the first and second colours and bleachable after a third dye lifetime of not less than 36 hours in the test solution.

Preferably one or more dosage forms are added either to a predetermined quantity of water or until an undissolved residue remains showing that the solution is saturated.

The buffer preferably provides a pH of 8.0 to 8.5 when the dosage form is dissolved in water.

The dosage form in use provides a clock system to give a visual indication of the time elapsed following activation of the disinfectant components, so that a user can know that the solution has a sufficient level of sporocidal or other biocidal activity. The clock system gives a multi coloured display analogous to a traffic light display.

In a preferred embodiment the first colour is purple, the dosage form producing a purple coloured solution when dissolved in water, the purple colour being bleached within the first lifetime when the desired concentration of peracetic acid, preferably 4000 ppm is reached.

The first indicator has a first dye lifetime before bleaching of 0.5 to 10 minutes, preferably 2 to 10 minutes, more preferably 2 to 7 minutes, most preferably 2 to 4 minutes.

After bleaching of the first colour, the second colour, which may be red or pink in a preferred embodiment, remains visible. The maintenance of the pink colour provides a visual indication that the solution was prepared within a predetermined time internal, for example 24 hours, during which the solution will remain at the active concentration of 4000 ppm or greater. The indicator provides a visual signal that the solution was prepared within a sufficiently short time period that the desired activity has not been lost. At a concentration of peracetic acid of 4000 ppm or more the solution is sporocidal within a contact time of 15 to 30 seconds. This provides a solution which may be used to disinfect surfaces by spraying and/or wiping before the surfaces can dry due to evaporation.

In an optional but preferred embodiment in which a third indicator is used, when the second, typically red or pink indicator is bleached after 24 hours in the preferred example, the third indicator may be observed. The lifetime of the third indicator may be 36 hours. In a preferred embodiment of the third indicator is yellow or orange. In the period until this indicator is bleached the solution may have a lower concentration of peracetic acid, typically 2000 ppm or greater at which the solution may be used as a virucidal disinfectant but may not have sporocidal properties. When the third indicator has been bleached the solution is spent and can be discarded.

During the use of the dosage form a solution in water may change from the colours purple, followed by pink, followed by orange, or yellow before becoming colourless.

Preferably the colour of the second indicator is darker and masks the colour of the third indicator. The first indicator may be further darker to mask both of the second and third colours before it is bleached.

The formulation of the indicator system may be arranged so that the second colour of the standing solution indicates a time period during which the peracetic acid concentration of greater than 1000 ppm, preferably 4000 ppm or more, is maintained for at least 24 hours at an ambient temperature. The second colour may be pink or red.

The third colour signal may be a change from a colour, for example red or yellow, to colourless. The system may be arranged so that the third colour of the standing solution which indicates a peracetic acid concentration of or greater than 1000 ppm, preferably 4000 ppm or more, is maintained for at least 24 hours at ambient temperature.

The peroxy activator is preferably a compound or mixture of compounds which produces an acetyl moiety when the dosage form is added to water.

A particularly advantageous peroxy activator is tetra acetyl ethylene diamine (TAED). Alternative compounds are selected from the group consisting of: 4-(acetoxy)-benzenesulfonic acid, potassium salt; 4-(acetoxy)-benzenesulfonic acid, sodium salt; 4-(octanoyloxy)-benzenesulfonic acid, sodium salt; 4-(t-butanoyloxy)-benzenesulfonic acid, sodium salt; N-[4-(triethylammoniomethyl)benzoyl]caprolactam chloride) (TBCC); sodium nonanoyloxybenzenesulfonate (NOBS) and mixtures thereof.

The amount of peroxy activator may be from about 11 wt % to 60 wt % of the solid dosage form, preferably 30 wt % to 55 wt %, more preferably 35 wt % to 55 wt %, most preferably 30 wt % to 50 wt %.

Percentages or other amounts referred to in this specification are by dry weight unless indicated otherwise and are selected from any ranges quoted to total 100%.

The peroxy compound which may be a peroxide is preferably selected from the group consisting of: sodium, potassium and ammonium salts of anions selected from the group consisting of: percarbonate, persulphate, perborate, perphosphate and mixtures thereof. Alternative peroxides include carbamide peroxide.

Particularly preferred peroxy compounds are selected from the group consisting of: sodium percarbonate, ammonium persulphate; calcium percarbonate; magnesium percarbonate; sodium perborate; sodium persulfate; sodium perphosphate; urea peroxide; and mixtures thereof.

Sodium percarbonate is particularly preferred and has favourable health and environmental properties.

Preferred dosage forms produce solutions which provide and maintain a concentration of at least 1000 ppm of peracetic acid for a period of 24 hours or longer. For example, concentrations of up to 1500 ppm or higher, preferably up to 4000 ppm or more may be obtained.

In preferred embodiments the ratio by weight of TAED to peroxide or peroxy compound is 50-70:100; preferably 40-80:100; more preferably 55-65:100; especially about 60:100.

A pH modifier or buffer is employed. The pH modifier may comprise a couple comprising sodium bicarbonate and anhydrous organic acid. This may be powdered or granular. The pH modifier may be one or more of citric acid, fumaric acid, tartaric acid and adipic acid. Anhydrous adipic acid is preferred.

The dosage form may be provided in the form of a tablet, for example, a compressed tablet or lozenge. An effervescent couple may be employed to facilitate dissolution. A disintegrant may be employed, for example polyvinyl pyrrolidone.

Alternatively, the dosage form may be provided as a powder contained in a capsule, sachet, pouch or other container. The container may be formed from a water soluble material, for example, polyvinyl alcohol. An example of a suitable water soluble thermoplastic film is Monosol® M8900.

The disinfectant composition described above may be provided in 30 g doses, or other suitable amounts such as 3 g or 6 g, in individual tablets, sachets or pouches. A bit comprising a selection of different doses may be provided for use with differently sized dispensing containers.

Dosage forms in accordance with this invention find particular application for dispensing solutions from sprayer bottles for example trigger sprayers. In such an application one tablet or other dosage form comprising a predetermined dose is added to the bottle which is filled with water, the bottle having a predetermined volumetric capacity. Alternatively lower dosage tablets may be added successively until no further dissolution occurs. After a short period, for example 2 minutes a purple colour develops to show the working strength of 4000 ppm has been achieved, following which the purple colour is bleached leaving a pink/red colour. This pink/red colour remains for 24 hours during which period a user can see from the colour displayed that the sprayer may be used for sporocidal disinfection. After 24 hours the pink colour is bleached leaving a yellow dye. The yellow colour indicates that a lower concentration of peracetic acid, for example 3500 ppm is available for virucidal and other non sporocidal disinfectant applications.

Dosage forms in accordance with this invention may provide several advantages over prior art chlorine based disinfectants. The user does not have to touch the disinfectant composition, thereby providing a health and safety benefit, in comparison to chlorine tablets which may be handled by a user.

The use of a sachet or pouch facilitates delivery of a metered dose of the ingredients. This eliminates user inconsistencies and avoids a need for measurement of powdered formulations.

The sachet and contents may dissolve within a short time for example 2 minutes in warm water, giving a disinfectant solution which gains maximum potency within a two minutes and maintains that level of potency over 24 hours or longer. Tablets may take significantly longer to dissolve.

The disinfectant composition in the form of a tablet can be dissolved in 1000 ml water at 35-40° C. The disinfectant composition can destroy microbial contamination, including spores such as *Clostridium difficile* 027 using a peracetic acid concentration of 4000 ppm and a contact time of 30 seconds. There is no contact with the active ingredient by the users. When the disinfectant composition is provided as a disinfectant system in a pouch or sachet, the ingredients are not compacted and therefore dissolve quicker than other forms. This leads to quicker release of the active ingredients. Also, the provision of the disinfectant composition in sachet, pouch or tablet form provides ease of usage and ease of storage.

The solution of peracetic acid is active against most pathogens even under "dirty" conditions in which interfering grime, protein or human detritus may be present.

In contrast, chlorine based disinfectants may lose efficacy in the presence of organic matter.

The disinfectant solution obtained is non-corrosive due to use of a corrosion inhibitor. Chlorine based disinfectants can corrode metals.

The mixture can also be used in powder form and dosed through manual or mechanical dosing systems, including the means of use of a measured capful.

A particular use as a powder is in the farming and agricultural industry to combat Foot and Mouth disease, Swine Vesicular disease, Diseases of Poultry Order and the Avian Influenza and Influenza of Avian Origin in Mammals, Tuberculosis Orders and General Orders. A further application is in animal kennels to combat Parvovirus in particular.

The colour indicator system may comprise two or more dye or indicator compounds. A preferred indicator system comprises a mixture of:

1. Reactive Red 195 (Single azo class; Molecular Formula:
   $C_{31}H_{19}ClN_7Na_5O_{19}S_6$; Molecular Weight: 1136.32 CAS Registry Number: 93050-79-4, see http://www.worlddy evariety.com/reactive-dyes/reactive-red-1.95.html, downloaded Aug. 10, 2018); and
2. C.I. 60730 (Acid Violet 43) (anthraquinone class: Molecular Formula:
   $C_{21}H_{14}NNaO_6S$; Molecular Weight: 431.39 CAS Registry Number: 4430-18-6, see http:www.worlddyevariety.com/acid-dyes/acid-violet-43 html. downloaded Aug. 10, 2018).

This is an example of an bleachable organic dye system which relies on oxidation of double bonds to affect colour change. Disruption of the double bond system will often result in colourless solutions. In the current invention, oxidation of the double bonds is achieved through hydrogen peroxide acting as an oxidising agent.

The indicators or dyes are non-mordant dyes. Mordant dyes are not preferred because they are staining.

Table 1 is a list of dyes which may be employed.

TABLE 1

| DYE | MOLECULAR WEIGHT | DURATION | STAIN |
|---|---|---|---|
| Indicator Turquoise HF | 780.16 | 15 hr 45 m | Stained |
| Indicator Scarlet BN | | | |
| Indicator Violet 5R | 735.59 | | |
| Reactive Red 195 (150%) | 1136.32 | | Not Stained |
| Indicator Red F3B | 933.76 | 3 Days | Not Stained |
| Indicator Red N2B (125%) | 748.11 | 15 hr 45 m | Not Stained |
| Indicator Violet NFBL (180%) | 662.77 | | |
| Indicator Violet 5R | 735.59 | | |
| Indicator Scarlet BN | | 15 hr 45 m | Stained |
| Reactive Red 195 | 1136.32 | 15 hr 45 m | |
| Indicator Turquoise HF | 780.16 | 15 hr 45 m | |
| Indicator Red F3B | 933.76 | | |
| Indicator Yellow HE6G | 1769.95 | | |
| Indicator Scarlett MX3G | 701 | | |
| Indicator Red ASD7 | 493.07 | | |
| Acid Red 52 | 580.65 | 15 hr 45 m | Not Stained |
| Acid Red 18 | 604.48 | 30 min | Not Stained |
| Acid Violet 43 | 431.39 | 5 min | |
| Acid Red 249 | 748.11 | | Not Stained |
| Acid Red 51 | 879.86 | | Not Stained |
| Acid Red 33 | 467.39 | | Not Stained |
| Azonine Red K (200%) | 675.60 | | Stained |
| Durantine Scarlet BNLE | 1177.0 | 3 Days | Stained |
| Durantine Red 5BR (200%) | | | |
| Durantine Red 5BR (125%) | 1373.07 | 3 Days | |
| Durantine Red C7B (125%) | 1673.43 | | Not Stained |
| F D & C Red No. 40 | 496 | 16 hr 15 m | Not Stained |
| Ext. D & C Violet No. 2 | 431 | | |
| 833 Eosina A Conc. | 647 | | |
| D & C Red 33 | 468 | | Not Stained |
| Ebest Red BW | 678 | | Stained |
| Ebest Red 3B | 548 | | Not Stained |
| Ebest Green B | 878 | | |
| Acid Green 1 | 978.46 | | |

Use of an non-mordant bleachable dye system has substantial advantages in comparison to the use of metal-organic colour systems. For example EP1755387 discloses the use of manganese catalysts in the presence of hydrogen peroxide.

Use of hydrogen peroxide in the presence of transition metals often produces unwanted side products. Formation of such unwanted side products in the current dosage forms may result in substantial impairment in reliable achievement of the required peracetic concentration of 4000 ppm.

Colour change of the solution due to bleaching of one or more dyes is used to indicate the attainment and maintenance of a desired concentration of peracetic acid and the length of time that the required concentration of 4000 ppm is maintained. Initially the solution may be purple. After two minutes the solution may turn red indicating that working concentration of 4000 ppm has been reached. The solution changes from red to orange or yellow to indicate that the level of peracetic acid has fallen below 4000 ppm and is disinfectant but is no longer affective against spores. Alternative indicator systems may be employed.

The composition may further comprise a chelating agent. Preferred chelating agents are selected from the group consisting of ethylenediaminetetracetic acid (EDTA), phosphones and mixtures thereof. Disodium or dipotassium EDTA may be used.

Diethylenetriamine penta(methylenephosphonic acid) sodium salt (DTPA) is an alternative preferred chelating agent. An amount of the chelating agent of 0.01 wt % to 1 wt %, preferably 0.01 wt % to 0.5 wt %, more preferably 0.09 wt % to 0.30 wt % may be used.

Alternative or additional chelating agents may be selected from the group consisting of: calcium disodium ethylene diamine tetra-acetate (E385); glucono delta-lactone (E575); sodium gluconate (E576); potassium gluconate (E577); sodium tripolyphosphate; sodium hexametaphosphate (E452i) and mixtures thereof. Alternatively, NTA, ethylenediaminetetracetic acid (EDTA), BAPTA, pentetic acid, Dequest® 4066 and mixtures thereof may be used.

The chelating agent may serve to reduce the presence of free transition metal ions since these may catalyse release of oxygen from active peroxide species in the solution.

The composition may further comprise an anionic surfactant. Anionic surfactants which may be used, are selected from the group consisting of a fatty alcohol sulphate, fatty alcohol phosphate, fatty alcohol benzene sulphonate, sodium and potassium salts of fatty acids, fatty alcohol ether sulphates; olefin sulphonates, lignosulphonates; sodium lauryl sulphate, phosphate esters and sarcosinates. Preferred anionic surfactants are sodium dodecyl benzene sulphonate, benzene sulfonic acid and sodium salt/sodium toluenesulphate.

Alternatively, a non-ionic surfactant may be used. These may be selected from the group consisting of ethyoxylated and propoxylated fatty alcohols, ethoxylated and propoxylated alkyl phenols, fatty acid esters, polyethylene glycol esters, alkyl glucosides, glyceryl and polyglyceryl esters, ethoxylated/propoxylated copolymers, ethoxylated thiols, glucose and sucrose esters, sugar esters, sorbitan esters, ethoxylated glucose and sucrose esters, ethoxylated sugar esters, ethoxylated sorbitan esters, linear and branced fatty alcohol (N-substituted) pyrrolidone derivatives. A preferred surfactant may comprise a fatty alcohol glucoside or an N-substituted pyrrolidone, for example, a C8-N-substituted pyrrolidone (or n-octyl pyrrolidone).

The surfactant may be present in an effective concentration, for example 0.01 wt % to 1.5 wt %, preferably 0.1 wt % to 0.3 wt %, more preferably 0.15 wt % to 0.25 wt %.

The composition may also comprise a corrosion inhibitor, for example, a triazole compound. The corrosion inhibitor may be present in the disinfectant composition in an amount in the range of 0.01 wt % to 0.5 wt %, preferably in the range of 0.1 wt % to 0.3 wt %, more preferably in the range of 0.15 wt % to 0.25 wt %. The corrosion inhibitor may be present in the disinfectant composition in an amount of 0.2 wt %.

The corrosion inhibitor may be one or more of BRADTECH® 6030, NOVERITE® K-739 and NOVERITE® K-797.

The composition may further comprise an emulsifier. A preferred emulsifier is PEG 6000 which may be provided as flakes.

A disintegrant may be employed. The disintegrant may be sodium carboxymethyl cellulose—marketed as Nilyn® XL-090.

The composition may further comprise an anti-caking agent. Examples of suitable anti-caking agents include SIPERNAT® 22 and SIPERNAT® 22 S.

Optionally the composition may further comprise a fragrance. An example of a suitable fragrance is Apple 41956 PERF.

The invention will be further described by means of example, but not in any limitative sense.

EXAMPLE 1

A disinfectant composition was formed by mixing the following powdered components:

| | |
|---|---|
| TAED | 30.75% |
| sodium percarbonate | 49.0% |
| citric acid (anhydrous) | 11.04% |
| sequestrant | 0.17% |
| sodium bicarbonate | 6.9% |
| surfactant | 1.00% |
| Reactive Red 195 | 0.06% |
| C.I. 60730 (acid violet 43) | 0.1% |
| perfume | 0.01% |
| manganese sulphate | 0.025% |
| corrosion inhibitor | 0.2% |
| non-active ingredients | balance |
| Total | 100 |

EXAMPLE 2

The following ingredients were added successively with mixing after each addition:

| TAED | wt% |
|---|---|
| sodium percarbonate monohydrate | 41.33 |
| anhydrous citric acid | 15 |
| dipotassium ethylenediamine acetate (EDTA) | 0.34 |
| sodium lauryl sulphate | 2 |
| sodium dodecylbenzene | 0.83 |
| corrosion inhibitor (BRADTECH ® 6030) | 0.2 |
| Reactive Red 195 | 0.07 |
| C.I. 60730 (acid violet 43) | 0.078 |
| sodium bicarbonate | 22.22 |
| perfume | 0.2 |
| Total | 100% |

The following steps were employed:
1) Sodium percarbonate added to TAED and allowed to mix
2) Sodium bicarbonate added to the mixture and allowed to mix
3) Surfactants added to the mixture and allowed to mix
4) Inhibitor added to the mixture and allowed to mix
5) Sequestrant added to the mixture and allowed to mix
6) The citric acid was then added to the liquid perfume in a separate mix and was kept apart from the main mix until dry
7) Citric acid and perfume mix added to the main mixture and allowed to mix
8) C.I. 60730 (acid violet 43) added to the mixture and allowed to mix
9) Reactive Red 195 added to the mixture and allowed to mix
10) Mixing was continued to ensure that there were no lumps and an even distribution of all the ingredients was obtained

EXAMPLE 3

A disinfectant composition was formed by mixing the following powdered components:

| | |
|---|---|
| TAED | 30.0% |
| sodium percarbonate | 50.0% |
| Dequest ® 4066 | 0.8% |
| SURFAC SDSB80 | 0.7% |
| adipic acid | 12.8% |
| NOVERITE ® K-739 | 0.3% |
| NOVERITE ® K-797 | 0.3% |
| PEG 6000 flakes | 0.5% |
| sodium bicarbonate | 2.89% |
| C.I. 60730 (acid violet 43) | 0.1% |
| Reactive Red 195 | 0.01% |
| Apple 41956 PERF | 0.4% |
| SIPERNAT ® 22 | 0.2% |
| SIPERNAT ® 22 S | 1.0% |
| Total | 100% |

(a) Formation of Pre-mixes
Pre-mix A

To a cylindrical plastic container with a diameter three times the diameter of the mixing blades was added SURFAC SDSB80 with subsequent mixing at a speed between 60 rpm and 85 rpm. Higher speeds resulted in coagulation of the surfactant due to heat build-up. SIPERNAT® 22 S was slowly added to the mixture under stirring conditions with care being taken that the SIPERNAT® 22 S did not come into contact with the mixing blades. It should be noted that SURFAC SDSB80 and SIPERNAT® 22S were added in a ratio of 2:1 to avoid SURFAC SDSB80 clumping together and adhering to the machine during pressing.

Pre-mix B

To a cylindrical plastic container with a diameter three times the diameter of the mixing blades was added SIPERNAT® 22. The container was then sealed with a lid and subsequently stirred between 60 rpm and 85 rpm. Higher speeds resulted in the evaporation of Apple 41956 PERF from SIPERNAT® 22 due to heat build-up. Apple 41956 PERF was slowly sprayed as a fine atomised mist into the container under stirring conditions with care being taken that the perfume did not make contact with the mixing blades. This ensured that the atomised droplets did not combine and thereby produce oversaturated SIPERNAT® 22. It should be noted that Apple 41956 PERF and SIPERNAT® 22 were added in a ratio of 1:2 to avoid coagulation in the mix. Upon satisfactory dispersement of the perfume throughout the mixture, C.I. 60730 (acid violet 43) was then slowly added to the mixture, under stirring conditions, with care being taken that the C.I. 60730 (acid violet 43) did not come into contact with the mixing blades. It was found that a small amount of C.I. 60730 (acid violet 43) became activated due to moisture being present in the mixture. This resulted in a darker and more ideal first stage colour indicator when dissolved in water. The mixture was mixed until a consistent colour was achieved. The mixture was then allowed to stand for 24 hours to provide an even distribution of perfume and colour dye.

(b) Formation of Disinfectant Composition

The following steps were employed:

1) Sodium percarbonate added to TAED and allowed to mix for 30 seconds
2) TAED added to the mixture and allowed to mix for 30 seconds
3) Adipic acid added to the mixture and allowed to mix for 30 seconds
4) Sodium bicarbonate added to the mixture and allowed to mix for 1 minute
5) Dequest® added to the mixture and allowed to mix for 30 seconds
6) PEG 6000 flakes added to the mixture and allowed to mix for 30 seconds
7) NOVERLITE® K-797 and NOVERLITE® K-739 added to mixture and allowed to mix for 30 seconds
8) Premix A added to the mixture and allowed to mix for 30 seconds
9) Pre-mix B added to the mixture and allowed to mix for 30 seconds
10) Reactive Red 195 added to the mixture and allowed to mix for 30 seconds
11) SIPERNAT® 22 S added to the mixture and allowed to mix for 5 minutes The resultant mixtures were compressed into individual tablets. A concentration of approximately 1000 ppm of peracetic acid is sufficient to provide sporicidal action. This was achieved by dissolution of an 6 g tablet in 1 litre of water at an ambient temperature to form a solution of peracetic acid.

The sanitiser/disinfectant is an alkaline solution utilising the range of 30 w % TAED to 50 w % percarbonate.

After thoroughly blending the mixture described in the Examples was pressed into tablets having a size that can be used in combination or singularly to produce 1000 ppm peracetic acid in 1 litre of water. For example, an 6 g tablet is used to produce the desired concentration in 1 litre of water.

The product was suitable for disinfecting and sanitising surfaces in hospital wards, environmental, clinical and laboratory surfaces, as well as heat sensitive equipment such as dialysis instruments, surgical instruments, suction bottles, bronchoscope, autoclaves and ear, nose, and throat instruments. The product can also be used to disinfect surfaces that have been contaminated by body fluids.

An experiment was carried out to determine the sporocidal activity of disinfectant solutions containing various concentrations of peracetic acid (PAA) prepared according to the present invention.

Test assays were inoculated with approximately $7.8 \times 10^6$ C. difficile spores ($6.89 \pm 0.29$ $\log_{10}$ colony forming-units [cfu]).

Increasing the concentration of the PAA disinfectant solution reduced the contact time required to reduce the numbers of C. difficile spores to below the detection limit.

In the absence of soiling, the Peracide PAA disinfectant solution demonstrated >6 $\log_{10}$ (99.9999%) reductions of C. difficile 027 spores to below the detection limit (4 cfu) within:

–15 minutes at 1000 ppm,

–3 minutes at 2000 ppm and

–30 seconds at 4000 ppm.

The $\log_{10}$ reductions and percentage reductions (kill-rate) of C. difficile 027 spores when exposed to varying concentrations of PAA is shown in table 2.

TABLE 2

Reduction of C. difficile 027 spores when exposed to Peracetic acid disinfectant

| | $\log_{10}$ reduction of C. difficile 027 spores | | | | | |
|---|---|---|---|---|---|---|
| Contact | 1000 ppm | | 2000 ppm | | 4000 pm | |
| time (minutes) | $\log_{10}$ reduction | Percentage Reduction* | $\log_{10}$ reduction | Percentage Reduction* | $\log_{10}$ reduction | Percentage Reduction* |
| 0 | 0 | 0 | 0 | 0 | 0 | 0 |
| 0.5 | 6.891 | 99.76179 | 6.892 | 99.99846 | 6.892 | 99.99995 |
| 1 | 6.892 | 99.94733 | 6.892 | 99.99982 | 6.892 | 99.99995 |
| 3 | 6.892 | 99.95933 | 6.892 | 99.99995 | 6.892 | 99.99995 |
| 5 | 6.892 | 99.97918 | 6.892 | 99.99995 | 6.892 | 99.99995 |
| 10 | 6.892 | 99.99492 | 6.892 | 99.99995 | 6.892 | 99.99995 |
| 15 | 6.892 | 99.99995 | 6.892 | 99.99995 | 6.892 | 99.99995 |
| 30 | 6.892 | 99.99995 | 6.892 | 99.99995 | 6.892 | 99.99995 |
| 45 | 6.892 | 99.99995 | 6.892 | 99.99995 | 6.892 | 99.99995 |
| 60 | 6.892 | 99.99995 | 6.892 | 99.99995 | 6.892 | 99.99995 |

*percentage reduction is the (kill-rate) of PAA at the specified contact time.

I claim:

1. A solid disinfectant dosage form having a predetermined dose for disinfecting surfaces and clinical devices in an aqueous disinfectant solution, comprising:
    a peroxy activator, wherein the peroxy activator is tetra acetyl ethylene diamine (TAED);
    a peroxy compound, wherein the peroxy compound is sodium percarbonate;
    a colour indicator system;
    a chelating agent in an amount ranging from 0.09 wt % to 0.30 wt % and selected from the group consisting of ethylenediaminetetraacetic acid (EDTA), disodium ethylenediaminetetraacetic acid (EDTA), sodium 2-[2-[bis(phosphonomethyl)amino]ethyl-(phosphonomethyl)amino]ethyl-(phosphonomethyl)amino]methyl-hydroxyphosphinate, or mixtures thereof; and,
    a buffer that maintains the pH of the system from 8.0 to 8.5 in the aqueous disinfectant solution;
    wherein,
    (i) the addition of the dosage form to a predetermined quantity of water produces the aqueous disinfectant solution containing peracetic acid in an active concentration of at least 4000 ppm;
(ii) the ratio of the peroxy activator to the peroxy compound is 55-65:100 wt %; and,
(iii) the colour indicator system comprises
a first non-mordant dye having a first colour and being bleachable after a first dye lifetime of 0.5 to 10 minutes in a test solution at 20° C. to 40° C. and pH 8.0 to 8.5 containing 0.05 wt % to 0.15 wt % of the dye and 45 wt % to 55 wt % of sodium percarbonate; and,
a second non-mordant dye having a second colour different from the first colour and bleachable after a second dye lifetime of not less than 24 hours in the test solution; wherein,
the second colour provides a visual indication that the active concentration of peracetic acid is at least 4000 ppm; and,
the bleaching of the second dye indicates that the concentration of peracetic acid is below 4000 ppm.

2. A dosage form as claimed in claim 1, wherein the dosage form produces a purple coloured solution when dissolved in water, the purple colour being bleached within the first lifetime when the said concentration of peracetic acid has been reached.

3. A dosage form as claimed in claim 1, wherein the second colour is red or pink.

4. A dosage form as claimed in claim 1, wherein the first indicator has a lifetime before bleaching of 0.5 to 10 minutes, 2 to 10 minutes, 2 to 7 minutes, or 2 to 4 minutes.

5. A dosage form as claimed in claim 1, comprising a third indicator having a lifetime before bleaching of 36 hours.

6. A dosage form as claimed in claim 1, wherein the amount of the peroxy activator is from about 20 wt % to about 55 wt % of the solid dosage form.

7. A dosage form as claimed in claim 1, wherein the amount of the peroxy activator is from about 30 wt % to about 50 wt % of the solid dosage form.

8. A dosage form as claimed in claim 1, wherein the ratio of the peroxy activator to the peroxy compound is from about 60-65:100 wt %.

9. A dosage form as claimed in claim 1, wherein the ratio of the peroxy activator to the peroxy compound is from about 55:100 wt %.

10. A dosage form as claimed in claim 1, wherein the ratio of the peroxy activator to the peroxy compound is from about 65:100 wt %.

11. A dosage form as claimed in claim 1, wherein the ratio of the peroxy activator to the peroxy compound is about 60:100 wt %.

12. A dosage form as claimed in claim 1, wherein the dosage form is provided as a tablet.

13. A dosage form as claimed in claim 1, wherein the dosage form is provided in a sachet or pouch formed of water soluble material.

14. A dosage form as claimed in claim 1, wherein the first mordant dye has the formula $C_{21}H_{14}NNaO_6S$; and, the second mordant dye has the formula $C_{31}H_{19}ClN_7Na_5O_{19}S_6$.

15. A dosage for as claimed in claim 1, further comprising an optional third non-mordant dye having a third colour different from the first and second colours and bleachable after a third dye lifetime of not less than 36 hours in the test solution.

* * * * *